United States Patent [19]

Voorheis et al.

[11] 4,047,489

[45] Sept. 13, 1977

[54] INTEGRATED PROCESS FOR PREPARING AND FIRING BAGASSE AND THE LIKE FOR STEAM POWER GENERATION

[75] Inventors: Temple S. Voorheis, Atherton; James H. White, Palo Alto, both of Calif.

[73] Assignee: Coen Company, Inc., Burlingame, Calif.

[21] Appl. No.: 647,029

[22] Filed: Jan. 7, 1976

[51] Int. Cl.² ............................................. F23G 5/04
[52] U.S. Cl. ................................. 110/15; 110/7 R; 110/8 P; 110/10; 110/49 R
[58] Field of Search ................ 110/7 R, 8 P, 15, 10, 110/49

[56] References Cited

U.S. PATENT DOCUMENTS

| | | | |
|---|---|---|---|
| 1,817,228 | 8/1931 | Bliss | 110/8 X |
| 2,148,981 | 2/1939 | Dundas et al. | 110/15 |
| 3,387,574 | 6/1968 | Mullen | 110/7 |
| 3,734,036 | 5/1973 | Abos | 110/15 |

*Primary Examiner*—Kenneth W. Sprague

*Attorney, Agent, or Firm*—Townsend and Townsend

[57] ABSTRACT

An integrated method is disclosed for preparing and suspension firing of bagasse and the like as the primary fuel for steam power generation in a cane sugar refinery. The method comprises mixing wet bagasse with de-ashed hot flue gases of a steam boiler, thereby drying it; separating bagasse dried thereby from the drying flue gases, capturing substantially all suspended dust; sizing the dried bagasse; directing bagasse fines to temporary storage while grinding and resizing any oversize bagasse; metering out and pneumatically suspending the fines, providing a smooth-flowing fuel responsive to a burner fuel feed control means; combusting the suspended fuel in a scroll feed type burner firing the steam boiler; de-ashing the combustion effluent, and utilizing the resultant flue gases for drying wet bagasse. Alternatively, the wet bagasse may be dried partially by de-ashed hot flue gases and partially by a bagasse fired supplementary hot air dryer, thereby further improving boiler operation efficiency.

7 Claims, 1 Drawing Figure

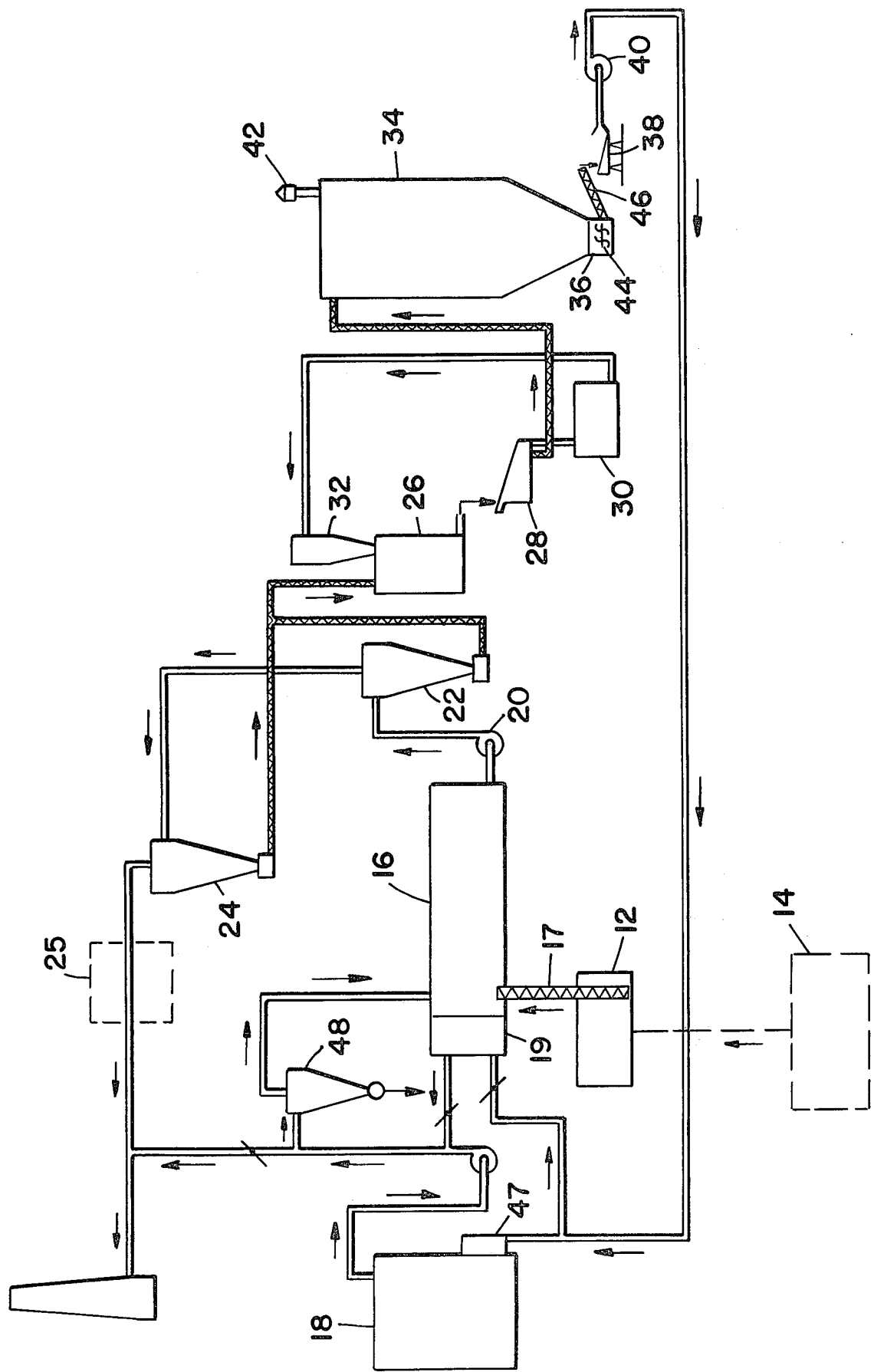

INTEGRATED PROCESS FOR PREPARING AND FIRING BAGASSE AND THE LIKE FOR STEAM POWER GENERATION

BACKGROUND OF THE INVENTION

1. Field of the Invention

This invention relates to methods for utilizing the by-products of a sugar cane refinery on site. In particular, this invention sets forth an efficient, low-pollutant producing integrated process for preparing and firing, in air suspension, waste bagasse and the like.

DESCRIPTION OF THE PRIOR ART

Increasing fossil fuel, transportation, and waste disposal costs, as well as an increasing need to minimize the amount of airborne pollutants, have imposed considerable constraints on the cane sugar refining process. In the past, fossil fuel fired boilers have been a principal source of power for a sugar refinery. The raw, wet discharge of chopped cane fiber and pith, herein referred to as bagasse, has required disposal, either by burning as a supplementary fuel for the boilers or by transportation to other facilities wherein the components of the raw bagasse may be extracted for use.

Wherever possible and economically feasible, the useful components of raw bagasse are extracted for use in the manufacture of products such as paper, fiberboard and the like. For this purpose, the raw bagasse may be processed in a de-pithing plant wherein the wet raw bagasse may be partially crushed and the coarser fibrous material extracted. The waste by-product of a de-pithing process is sometimes referred to as bagassillo. As herein used, the term bagassillo refers generally to a mixture of pith and some finely divided fibrous material of less than three mesh size. Bagassillo may also refer to any relatively finely divided mixture of pith and fibrous material discharged from a de-pithing facility.

Bagasse and bagasse by-products such as bagassillo have been recognized in the prior art as a supplemental fuel to oil and the like on a refinery site and in relatively large scale combustion facilities. Generally, ward furnaces or chain grates are used to fire bagasse, which is typically introduced directly into a furnace in a state of high moisture content. The prior art also discloses tangential firing wherein bagasse is introduced into a furnace through a pipe under relatively high pressure and is maintained in suspension in a furnace until it is dried and fired. With such a method, smoke is produced even though adequate air is provided since it is very difficult for air to penetrate the fuel stream. U.S. Pat. No. 3,387,574 is but one example of the pipe inlet tangential firing technique.

Bagasse fired according to the prior art is not useful as a primary fuel in a refinery's steam power generation boilers because, as a raw wet discharge, its net heating value is often insufficient for a plant's requirements. Moreover, as raw bagasse tends to burn inefficiently, excessive particulate emissions result in undesired air pollution.

Bagasse has not been recognized as an efficient primary fuel source for steam boiler power generation for a further reason. Firing techniques for bagasse found in the prior art do not promote rapid responsiveness to changes in loading. In particular, a steam boiler must be capable of rapidly changing its heat output in order to maintain constant pressure in a steam header driving an electrical power generator. A capability to rapidly respond to changes in loading promotes overall system efficiency. Fuel oil by itself is capable of sufficiently responsive firing to meet varying loading requirements. However, in recent times, fuel oil has been increasing in cost and decreasing in availability. It is possible to improve economies by firing a mixture of bagasse and fuel oil. In fact, bagasse may be fired at a constant level below a predetermined threshhold while fuel oil may be variably fired to regulate boiler load within a preselected range. Ideally, however, it is preferable to eliminate the use of fuel oil altogether wherever possible, for example, where the heating value of bagasse is sufficient and air pollution restrictions can be met. In a bagasse fired steam powered generating facility, oil might therefore be utilized merely as a standing pilot flame, for start-up purposes, or as a back-up fuel during peak power periods.

In the prior art, it has been recognized that drying of wet bagasse with the waste heat of flue gases increases the net heating value of reject portions of wet bagasse. U.S. Pat. No. 1,155,741 discloses a method for drying and grinding bagasse to facilitate separation of selected fibers, and wherein the rejected fractions of the bagasse are utilized to fire the drying burners. However, the known prior art neither discloses a method nor recognizes an advantage for preparing the waste bagasse as the primary fuel for steam boiler power generation.

SUMMARY OF THE INVENTION

The method of the present invention provides an integrated process for preparing and suspension firing bagasse and bagassillo as the primary fuel for heating and steam power generation in a sugar cane refinery. The method comprises principal steps of mixing wet bagasse (or bagassillo) with de-ashed hot flue gases of a bagasse fired steam boiler, thereby drying it; separating bagasse dried thereby from the drying flue gases, capturing substantially all suspended dust to prevent its exhaustion into the atmosphere; sizing the dried bagasse, directing bagasse fines up to a maximum preselected size to a temporary storage facility, while re-grinding and resizing oversize bagasse; metering out, spacing and pneumatically suspending the bagasse fines in a conduit, providing a smooth-flowing fuel responsive to burner fuel feed control means; combusting the air suspended fuel in a scroll feed type burner firing the steam boiler, minimizing smoke production; de-ashing the combustion effluent; and utilizing the resultant flue gases for drying subsequent quantities of wet bagasse to a desired moisture content.

Alternatively, where steam power generating needs do not produce adequate waste heat for drying the supply of wet bagasse, the wet bagasse may be dried partially by de-ashed hot flue gases and partially by a bagasse fired air heater, such as an inner-air wall air heater, thereby permitting the steam boiler to operate at a further improved efficiency level.

It is a primary object of this invention to provide a method for integrally preparing and firing waste bagasse and waste bagasse by-products such as bagassillo wherein the fuel exhibits burning efficiency, air pollution characteristics, firing responsiveness and economies equal or superior to known firing methods utilized in cane sugar refining plants, and wherein the method of preparation of the fuel is itself highly efficient and substantially non-polluting.

Particular advantages are obtained by integrally preparing and firing bagasse by-product fuel as herein disclosed because many desirable features are combined. For example, this method substantially reduces the use and thus the expense of fossil fuel over prior art methods and systems. Moreover, a cane sugar refinery may be rendered substantially self-sustaining, so far as heating and power requirements are concerned. This is due to the more efficient combustion of available fuel as a result of the combination of the method of waste fuel drying and of suspension firing. This increases the apparent quantity of available fuel by increasing the net heating value per pound of fuel.

It is a further object of the present invention to provide a method for preparing and firing bagasse such that the firing of the bagasse is as responsive as fuel oil to changes in loading. To this end, bagasse fines are uniformly dispersed, pneumatically suspended, conveyed and fired in suspension in a scroll feed type burner.

A still further object of this invention is to minimize the volume and weight of disposable waste without substantially decreasing the efficiency of the combustion process. This is accomplished by firing in suspension sized dried bagasse fines in a scroll feed type burner, which itself is a particularly efficient firing apparatus, and thereafter extracting the ash and fly ash from the combustion effluent prior to the use of the hot flue gases for drying. In this manner, the only solid waste by-product is a substantially burned dry ash which does not accumulate in the boiler and which is relatively easily recirculated through the combustion cycle for achieving substantially complete combustion. Therefore, the resultant ash is not so minute as to render difficult its removal from the stack effluent.

Another object of the inventive method is to minimize the pollutant content of the stack effluent from both combustion and fuel preparation. To this end, ash is removed prior to fuel drying, and primary and secondary cyclone collections are performed on the expended flue gases to separate the expended flue gases from the dried bagasse fuel. Furthermore, the scroll feed type method of combustion minimizes the production of smoke resulting from the discharge of substantially unburned particulates.

A still further object of the invention is to provide a method for utilizing dried bagasse fines as a fuel wherein the fines themselves need not be so finely divided as to render its combustion by-product (flyash) difficult to remove from the effluent. To this end, scroll feed type suspension firing of dried fines is utilized. The substantial intermixing of air and fuel according to this combustion method eliminates need for extremely finely divided fines to achieve substantially complete and smokeless combustion.

BRIEF DESCRIPTION OF THE DRAWING

Further objects and advantages of this invention will become apparent upon reference to the following detailed description of preferred embodiments, together with the following single FIGURE wherein:

The FIGURE is a schematic representation of a system operative according to the inventive method.

DETAILED DESCRIPTION OF PREFERRED EMBODIMENTS

Referring to the FIGURE, there is shown the preferred embodiment of a system useful in a sugar refinery which system is operable according to the inventive method. The system embodiment includes a feed bin 12 for receiving wet bagasse or wet bagassillo, (as for example, from a de-pithing plant 14) a drying chamber 16, operative to utilize the waste heat of a boiler 18, a dryer fan 20, a primary cyclone collector 22, a secondary cyclone collector 24, a surge bin 26, a vibrating screen classifier 28, a hammer mill 30, a particulate collector 32, an enclosed dried fines storage bin 34, a bin discharger 36, a shaker table 38, and a fines conveying fan 40.

The system is operative as follows: Waste bagasse or bagassillo is provided to the feed bin 12 from a source such as the de-pithing plant 14. The waste bagasse (sometimes herein referred to as wet bagasse) is typically of about fifty percent (50%) water content. The feed bin 12 is operative to handle surges in the wet bagasse supply allowing it to be conveyed evenly through the subsequent processing steps. The wet bagasse is thereupon provided to the drying chamber 16, via a screw feeder 17 or the like, where it is dried to between 15% and 20% moisture content and preferably to about 17% moisture content. A dried product of this moisture content has a net heating value of approximately 6,000 btu/pound. The drying chamber 16 may be a single pass rotary dehydrating unit of adequate size and heating capacity, or it may be a flash tube dryer, a fluidized bed dryer or vertical dryer of adequate size and heating capacity.

The heat source for drying according to the inventive method may be waste heat, preferably the output flue gas of the bagasse fired boiler 18 which is intermixed with the wet bagasse. The temperature of the flue gas provided to the drying chamber 16 is typically about 650° F. However, flue gas in adequate quantity with a temperature in excess of approximately 610° F. is suitable for purposes of practical drying.

In addition, the drying chamber may be provided with a bagasse fired supplementary air heater 19, such as an inner-air wall air heater, which is manufactured by Coen Company of Burlingame, California, the assignee of the present invention. A bagasse fired scroll feed burner may be incorporated into the air heater 19 for drying wet bagasse without intermixture of hot flue gases. The supplementary air heater 19 enables the continued processing of wet bagasse when the boiler 18 is operating below a capacity sufficient to dry all the wet bagasse. Moreover, it has been found that its use results in improved combustion efficiency of the boiler 18.

The gaseous and dried particulate effluent of the drying chamber 16 is pneumatically conveyed in suspension via the dryer fan 20 to the primary cyclone collector 22. Typically, the temperature of the solids in the effluent at this stage is about 200° F., while the temperature of the effluent gases is typically about 240° F. The primary cyclone collector separates the effluent gases from the dried particulate solid (hereinafter called dried bagasse), collects and conveys it by suitable means such as a bucket conveyor 25 to the surge bin 26.

The dried bagasse may not be completely extracted by the primary cyclone collector 22. Therefore, the waste discharge of the primary cyclone collector 22, may be further processed in the secondary cyclone collector 24, which further extracts dried bagasse particulates from suspension. The secondary cyclone collector 24, has been found to markedly improve the collection efficiency of the overall system according to the method, since the initial concentration of dried bagasse inducted thereinto is sufficiently low to permit substantially total particulate extraction. The dried bagasse extracted by the secondary cyclone collector 24 is likewise delivered to the surge bin 26 for temporary storage.

The waste gas discharge of the secondary cyclone collector 24 is released into the atmosphere through a stack 27 or the like. Because of this primary and secondary cyclone collection procedure, maximum dust removal from the gaseous effluent prior to discharge into the atmosphere is assured. Where still further effluent cleaning may be required, a supplementary effluent cleaner 25, such as a wet scrubber, may be provided in the exhaust line prior to exhaust discharge to the atmosphere.

The dried bagasse collected in the surge bin 26, has typically a 15% to 25% moisture content and preferably approximately 17% moisture content. As a fuel, dried bagasse with this percentage moisture content has substantially improved heating value over unprocessed, or wet, bagasse or bagassillo. However, about one-third of this dried product is of a size too large for use as a fuel with the desired characteristics according to the invention. In particular, fuel with oversized particulates may not completely combust in a furnace before falling to the furnace floor. Furthermore, oversized particulate fuel may have a burning rate which is not adapted to respond to required rapid changes in the firing rate of a steam boiler or the like. According to the invention, dried bagasse or bagassillo fuel is reduced to a fine of a maximum pre-selected size. In particular, the dried bagasse or bagassillo from the surge bin 26 is conveyed by a screw conveyer or the like to the vibrating screen classifier 28, where oversized particulates are separated from the dried bagasse or bagassillo fines. Particles of less than 12 mesh (ASTM), or about 1.7 mm diameter, are permitted to pass through a classifying screen of the classifier 28, whereupon the sized particulate material is mechanically conveyed to the storage bin 34.

Oversized particulate material is rejected by the classifier 28 and is directed (generally by gravity) to the hammer mill 30.

The hammer mill 30 grinds the oversized material. The discharge of the hammer mill 30 is pneumatically conveyed back to the surge bin 26 through the particulate collector 32 where it is thereafter sized and eventually conveyed to the storage bin 34. As a precautionary feature in a practical system, it is adviseable that the capacity of the hammer mill regrinding circuit, comprising hammer mill 30, particulate collector 32, surge bin 26, and vibrating screen classifier 28, be at least 150% of the expected nominal amount of oversized material.

The storage bin 34 serves as a fuel tank for the system. Therefore, the storage bin 34 must be of adequate capacity to store bagassillo or bagasse fines for utilization as fuel or the like during periods of reduced bagasse production, such as on weekends and holidays. To inhibit dust production the storage bin 34 may preferably be provided with a ventilator outlet 42.

The bin discharger 36 in the outlet neck of the storage bin 32 is provided for extracting the bagasillo or bagasse fines from the storage bin 34. Because the fines are a fibrous material, they have a tendency to arch across the bin outlet under their own weight and thereby to interrupt flow. Therefore, the bin discharger 36 may include arch breakers 44 to insure smooth and uninterrupted flow. Arch breakers 44 may be rotating arms at the neck of the storage bin 34, which dislodge the compacted fibrous fines.

The discharger 36 also incorporates a metering screw 46 operative in response to a suitable burner firing rate control system for controling the fuel feed rate of the fines. The metering screw 46 in turn feeds the shaker table 38 which is operative to further smooth the flow. Because of the fibrous and powdery nature of the fines, the discharge from the storage bin 34 tends to be somewhat uneven. Thus, it is desirable to smooth the flow. The vibration of the fines on the shaker table 38 provides the desired flow-smoothing function.

Fines are transported pneumatically at the required rate through the fines conveying fan 40. In particular, the fan 40 may provide the fines as a fuel in a premixed and preheated air suspension to the boiler 18, which may be a part of the steam heating and electrical power generating system for the refinery. The boiler 18 must be equipped with a burner suitable for combusting the fines. Preferably a scroll feed type burner 47 may be utilized. A suitable dual air zone scroll feed type burner is described in U.S. Pat. No. 3,391,981, which is incorporated by reference herein. A particulate burner may also include a secondary or pilot fuel firing unit utilizing oil or gas. As a practical matter, a standing pilot is necessary to assure uninterrupted firing in case of particulate fuel interruption and to provide for cold start-up.

The exhaust of the boiler 18, after heat has been extracted for steam heating and power generation is typically approximately 650° F.. This temperature is generally sufficient to de-hydrate wet bagasse as previously herein described.

As a result of the combustion of the bagasse or bagassillo fines, the boiler exhaust contains some ash. To minimize air pollution, this ash requires extraction, preferably prior to intermixture with wet bagasse or bagassillo. This boiler exhaust is therefore directed to pass through an ash collector 48. The ash collector 48 is preferably a multi-cyclone collector which is capable of extracting in excess of 98% of the ash content of the exhaust. Since the size of fines readily combusted in a scroll feed type suspension burner need not be particularly minute, the ash collection efficiency of a multi-cyclone collector is enhanced.

The heated flue gas discharged from the ash collector 48 is provided to the drying chamber 16 as previously described.

A method according to the invention may therefore be set forth as follows:

Receiving and temporarily storing wet bagasse;

Intermixing hot flue gases from a dried bagasse fines fired boiler with the wet bagasse to produce dried bagasse of typically 15% to 25% moisture content and preferably about 17% moisture content;

Pneumatically conveying the intermixed effluent of flue gases and dried bagasse to a primary cyclone collector and therein extracting at least a portion of the dried gas from the effluent;

Conveying the waste effluent of the primary cyclone collector to a secondary cyclone collector and therein extracting substantially all the remaining dried bagasse from the effluent, discharging the effluent to the atmosphere;

Conveying to and temporarily storing in a surge bin the dried bagasse;

Separating out bagasse fines suitable for use as a fuel from oversized dried bagasse by vibrating the dried bagasse upon a screen classifier sizing the dried bagasse;

Pulverizing oversized bagasse in a hammer mill and reconveying the pulverized product to the surge bin for resizing; and Storing the bagasse fines for use as a fuel in a bagasse fired burner.

In addition, the method for further preparation and utilization of the bagasse fines as fuel proceeds as follows:

Discharging bagasse fines from storage and shaking the discharge to establish a substantially uniform fines supply;

Pneumatically suspending the fines to establish a combustionable dried fuel-air mixture suitable for conveyance and combustion in a scroll feed type burner;

Directing the combustible mixture to the scroll feed type burner in response to means controlling the firing rate of the burner;

Directing the flue effluent of the burner through a multi-cyclone collector, extracting substantially all resultant ash therefrom; and Utilizing the de-ashed flue gases to dehydrate wet bagasse.

Alternatively the method may further include a step of partially drying the wet bagasse in a bagasse fired inner air wall air heater or the like wherein the flue gases are not intermixed with the wet bagasse.

The intergrated process for preparing and suspension firing bagasse as a primary fuel for steam power generation is a sugar refinery may be described as follows:

Mixing wet bagasse (or bagassillo) with de-ashed hot flue gases of a bagasse fired steam boiler, thereby drying the wet bagasse;

Separating bagasse dried thereby from the drying flue gases capturing substantially all suspended dust for preventing its exhaustion into the atmosphere;

Sizing the dried bagasse, directing bagasse fines up to a maximum pre-selected size to temporary storage while re-grinding and resizing oversized bagasse;

Metering out, spacing and pneumatically suspending the fines for providing a smooth flowing fuel;

Providing the pneumatically suspended fine fuel to a suspension type particulate burner in response to a burner fuel feed control means;

Combusting the suspended fuel in a scroll feed type burner, firing a steam boiler;

De-ashing the combustion effluent; and

Utilizing the resultant flue gases for subsequent drying of wet bagasse.

The wet bagasse to be dried according to the invention method may be approximately 50% moisture content. The temperature of the hot flue gases utilized for drying may be approximately 650° F., however, the temperature may be as low as 610° F. The bagasse dried according to the inventive method may be of approximately 17% moisture content.

This inventive method has been described with reference to particular embodiments. Further embodiments will be obvious to those of ordinary mechanical skill in the art in light of the present disclosure. Therefore, it is not intended that the invention be limited except as indicated by the appended claims.

We claim:

1. An integrated method for preparing and suspension firing bagasse and bagassillo as a primary fuel for heating and steam power generation in a sugar cane refinery which produces bagasse and bagassillo as a wet by-product which comprises the repetitive substantially continuous sequential steps of:

mixing the wet by-product with de-ashed hot flue gases of a bagasse fired suspension burner, thereby drying it and reducing the temperature of the drying flue gases;

separating the by-product dried thereby from the drying flue gases in a primary cyclone collector and directing the flue gases emitted from said primary cyclone collector through a secondary cyclone collector to capture substantially all suspended particulate material preventing its exhaustion into the atmosphere; thereafter sizing the dried by-product, directing by-product fines up to a maximum pre-selected size to temporary substantially enclosed storage while regrinding and resizing oversized by-product; thereafter metering out, spacing and pneumatically suspending the by-product fines, for providing a smooth-flowing suspended fuel-air mixture; thereafter controllably firing the suspended mixture in a suspension type furnace burner to produce a relatively high temperature heat output and a combustion effluent characterized by substantially complete combustion; thereafter directing the combustion effluent through a cyclone collector to extract substantially all ash from the hot flue gases of the burner; and thereafter utilizing the resultant flue gases for subsequent drying of further wet by-product.

2. A method according to claim 1 wherein said de-ashed hot flue gases in excess of a temperature of approximately 610° F. dry said wet by-product to a moisture content of between approximately 15% and 25%.

3. A method according to claim 2 wherein the dried by-product is sized to a maximum of approximately 12 mesh (ASTM).

4. A method according to claim 1 further including the step of suspension firing said dried by-product in a scroll feed type burner firing a steam boiler.

5. A method according to claim 4 wherein said wet by-product is partially dried by a dried by-product fired air heater.

6. A method according to claim 4 wherein the stored fines are metered out through an arch breaking means, is spaced by a shaker table and pneumatically suspended by a fan.

7. A method according to claim 6 wherein said suspended fines are provided in a smooth flowing fuel mixture responsive to a burner fuel feed control signal.

* * * * *